United States Patent
Budmiger

(10) Patent No.: US 7,070,324 B2
(45) Date of Patent: Jul. 4, 2006

(54) METHOD AND DEVICE FOR SYSTEM AND/OR PROCESS MONITORING

(75) Inventor: Thomas Budmiger, Ettingen (CH)

(73) Assignee: Endress & Hauser Flowtec AG, Reinach (CH)

( * ) Notice: Subject to any disclaimer, the term of this patent is extended or adjusted under 35 U.S.C. 154(b) by 0 days.

(21) Appl. No.: 10/432,634

(22) PCT Filed: Dec. 1, 2001

(86) PCT No.: PCT/EP01/14053

§ 371 (c)(1),
(2), (4) Date: Jun. 9, 2003

(87) PCT Pub. No.: WO02/46851

PCT Pub. Date: Jun. 13, 2002

(65) Prior Publication Data

US 2004/0037349 A1   Feb. 26, 2004

(30) Foreign Application Priority Data

Dec. 7, 2000   (DE) ............................... 100 60 706

(51) Int. Cl.
*G05B 23/02* (2006.01)
(52) U.S. Cl. .................. 374/57; 374/102; 374/142; 374/148; 374/152; 702/136; 702/183; 702/187; 702/188; 73/861.12
(58) Field of Classification Search .............. 374/54, 374/57, 102, 107, 142, 152, 147, 148; 702/130, 702/132, 133, 136, 183, 187, 188, 65; 324/204; 73/861.08, 861.11, 861.12, 861.13, 861.14, 73/861.15; 340/588, 589
See application file for complete search history.

(56) References Cited

U.S. PATENT DOCUMENTS

| | | | | |
|---|---|---|---|---|
| 4,236,410 A | * | 12/1980 | Appel et al. ............. | 73/861.12 |
| 4,483,629 A | * | 11/1984 | Schwarz et al. .............. | 374/57 |
| 4,558,227 A | | 12/1985 | Yanada et al. ............ | 290/40 R |
| 4,623,265 A | * | 11/1986 | Poyser ........................ | 702/65 |
| 4,715,233 A | * | 12/1987 | Neven et al. ............ | 73/861.12 |
| 4,733,974 A | * | 3/1988 | Hagerman ................... | 374/57 |
| 4,764,882 A | | 8/1988 | Braschel et al. ............. | 702/42 |
| 4,792,912 A | | 12/1988 | Kuramoto et al. .......... | 702/136 |
| 4,897,584 A | * | 1/1990 | Grutzmacher et al. ...... | 374/152 |
| 4,908,775 A | | 3/1990 | Palusamy et al. ............. | 702/34 |
| 4,972,722 A | * | 11/1990 | Hansen et al. ........... | 73/861.17 |
| 4,984,460 A | * | 1/1991 | Isoda .......................... | 374/54 |
| 5,019,760 A | * | 5/1991 | Chu et al. ................... | 374/102 |
| 5,157,619 A | | 10/1992 | Palusamy et al. ............. | 702/43 |
| 5,469,746 A | * | 11/1995 | Fukunaga et al. ....... | 73/861.12 |
| 5,528,940 A | | 6/1996 | Yamamoto et al. ........... | 73/708 |

(Continued)

*Primary Examiner*—Diego Gutierrez
*Assistant Examiner*—Stanley J. Pruchnic, Jr.
(74) *Attorney, Agent, or Firm*—Bacon & Thomas

(57) ABSTRACT

The invention relates to a method and to a device for system- and/or process-monitoring in connection with a measurement apparatus that determines/monitors at least one process parameter of a medium. The method and device enable statements to be made regarding the present and future functionality of a measurement apparatus, or individual components of the measurement apparatus. The temperature values (T) of the medium are ascertained directly or indirectly and a trend analysis regarding the thermal loading of the measurement apparatus or the thermal loading of individual components of the measurement apparatus is carried out on the basis of the ascertained temperature values (T) of the medium or on the basis of the derivatives of the ascertained temperature values of the medium.

9 Claims, 2 Drawing Sheets

U.S. PATENT DOCUMENTS

| | | | |
|---|---|---|---|
| 5,623,426 A | 4/1997 | Ozawa et al. | 702/99 |
| 5,828,567 A * | 10/1998 | Eryurek et al. | 702/182 |
| 5,927,854 A * | 7/1999 | Kroll | 374/102 |
| 6,434,504 B1 * | 8/2002 | Eryurek et al. | 702/130 |
| 6,505,517 B1 * | 1/2003 | Eryurek et al. | 73/861.08 |
| 6,532,829 B1 * | 3/2003 | Franklin | 73/861.66 |
| 6,539,811 B1 * | 4/2003 | Budmiger | 73/861.15 |
| 6,556,145 B1 * | 4/2003 | Kirkpatrick et al. | 702/133 |
| 6,594,603 B1 * | 7/2003 | Eryurek et al. | 702/130 |
| 6,701,274 B1 * | 3/2004 | Eryurek et al. | 702/130 |
| 6,727,821 B1 * | 4/2004 | Weekes et al. | 340/588 |
| 2002/0016689 A1 * | 2/2002 | Yokoyama et al. | 702/65 |

* cited by examiner

METHOD AND DEVICE FOR SYSTEM AND/OR PROCESS MONITORING

FIELD OF THE INVENTION

The invention relates to a method and to a device for system- and/or process-monitoring in connection with a measurement apparatus that determines at least one process parameter of a medium. For example, this process parameter can be a mass- or volume-flow through a measurement tube. Of course, the process parameter can also be a fill level, the pressure or another physical or chemical parameter to be measured.

BACKGROUND OF THE INVENTION

In connection with the determination and/or monitoring of process parameters, there is a tendency increasingly in the direction of making available to the user, along with the measurement apparatus itself, also information on the mode of operation or the life span of the measurement apparatus under current system- and/or process-conditions. Catchwords in use in this connection are 'Predictive Maintenance' and 'Mean Time Before Failure'. The goal of these efforts is ultimately to eliminate, or reduce to a minimum, the downtime of a measurement apparatus.

SUMMARY OF THE INVENTION

An object of the invention is to provide a method and a device which enable statements to be made regarding the present and future functionality of a measurement apparatus, or individual components of the measurement apparatus.

Regarding the method, the object is solved in the manner that the temperature values of the medium are ascertained directly or indirectly and that a trend analysis regarding the thermal loading of the measurement apparatus or the thermal loading of individual components of the measurement apparatus is carried out on the basis of the ascertained temperature values of the medium or on the basis of the derivatives of the ascertained temperature values of the medium.

Regarding the device, the object is solved in the manner that a unit for direct measurement of the temperature values or the derivatives of the temperature values is provided or that the temperature values or the derivatives of the temperature values are indirectly ascertained, and that an evaluation-/control-unit is provided that performs a trend analysis regarding the thermal loading of the measurement apparatus or the thermal loading of individual components of the measurement apparatus on the basis of the established temperature values of the medium or on the basis of the derivatives of the established temperature values of the medium.

According to an advantageous embodiment of the device of the invention, the measurement apparatus is for determining mass or volume flow of a medium through a measurement tube. Used for such measurements are, among others, coriolis measurement apparatuses, ultrasonic measurement apparatuses or magnetic-inductive measurement apparatuses. Such apparatuses are sold by the applicant in different variants under the marks 'PROMASS', 'PROFLOW' and 'PROMAG'.

A magnetic-inductive flow measuring apparatus is described in more detail in the following as an especially advantageous embodiment of the device of the invention.

Magnetic-inductive flow measurement apparatuses utilize for volumetric flow measurement the principle of electrodynamic induction: Charge carriers of the measurement medium moved perpendicularly to a magnetic field induce a voltage in measurement electrodes likewise arranged essentially perpendicularly to the flow direction of the measurement medium. This induced voltage is proportional to the flow velocity of the measurement medium averaged over the cross section of the tube; it is, thus, proportional to the volume flow.

Usually, a magnetic-inductive measurement apparatus exhibits a measurement tube, a magnet component containing two electromagnets, at least one measurement electrode and an evaluation-/control-unit. The medium to be measured or monitored flows through the measurement tube in the direction of the longitudinal axis of the measurement tube. The magnet component produces a magnetic field passing through the measurement tube and oriented essentially crosswise to the longitudinal axis of the measurement tube. The at least one measurement electrode is arranged in a lateral region of the measurement tube and coupled galvanically or capacitively with the medium. The evaluation-/control-unit uses a measurement voltage induced in the measurement electrode to produce information about the volume flow of the medium in the measurement tube.

According to an embodiment of the device of the invention, a temperature sensor is the unit for determining the temperature values or the derivatives of the temperature values. The temperature sensor is so arranged that it comes in contact with the medium, or it is so arranged that it is in immediate proximity to the medium and produces a value for the temperature of the measurement system. Suitable temperature sensors are PTC-elements, e.g. a PT 100, NTC-elements, thermoelements, semiconductor sensors, etc.

Alternatively, measurement of the temperature of the medium can also proceed indirectly. For instance, the control-/evaluation equipment can monitor the resistance of the at least one electromagnet over an extended time. The control-/evaluation unit determines the temperature or the temperature change of the electromagnet on the basis of the measured resistance values and uses the established temperature values of the at least one electromagnet for a trend analysis with respect to the thermal loading of the magnetic-inductive measurement apparatus or with respect to the thermal loading of individual components of the magnetic-inductive measurement apparatus.

Especially, information on long-term temperature loading or information on short-term temperature spike loading is used to make a statement regarding life span of the measurement apparatus or regarding the life span of individual components of the measurement apparatus.

According to an advantageous further development of the device of the invention, a storage unit is provided, in which the resistance values of the electromagnet are stored as a function of temperature. Preferably, the storage unit files characteristic curves that give the resistance of the electromagnet or the resistance changes of the at least one electromagnet with reference to the temperature or, respectively, the temperature changes of the measurement apparatus and, consequently, also with reference to the temperature or, respectively, the temperature changes of the medium.

Furthermore, it is provided that the storage unit stores characteristic curves that offer a relationship between the temperature of the electromagnet, or the measurement apparatus, and the probable life span of the measurement apparatus or of individual components of the measurement apparatus.

In this connection, it has been found to be especially advantageous, if the characteristic curves are empirically established curves.

It is understood that the temperature of the at least one electromagnet cannot, without more, be set equal to the temperature of the medium or to the temperature of the measurement apparatus. Thus, a short-term cooling or the warming of the medium by way of the environment can cause certain temperature differences. Also, different nominal widths of the measurement tube play a role, as does the electrical heating of the one or more electromagnets. Nevertheless, thermal loading or peak loading of the measurement apparatus can be established with sufficient accuracy using the device of the invention.

According to a simple and practical embodiment of the device of the invention, an output-/display-unit is provided for informing operating personnel of the result, or latest result, of the trend analysis, particularly the probable life span of the measurement apparatus.

BRIEF DESCRIPTION OF THE DRAWINGS

The invention is explained in greater detail on the basis of the following drawings, which show as follows.

DESCRIPTION OF THE PREFERRED EMBODIMENTS

Figure 1:
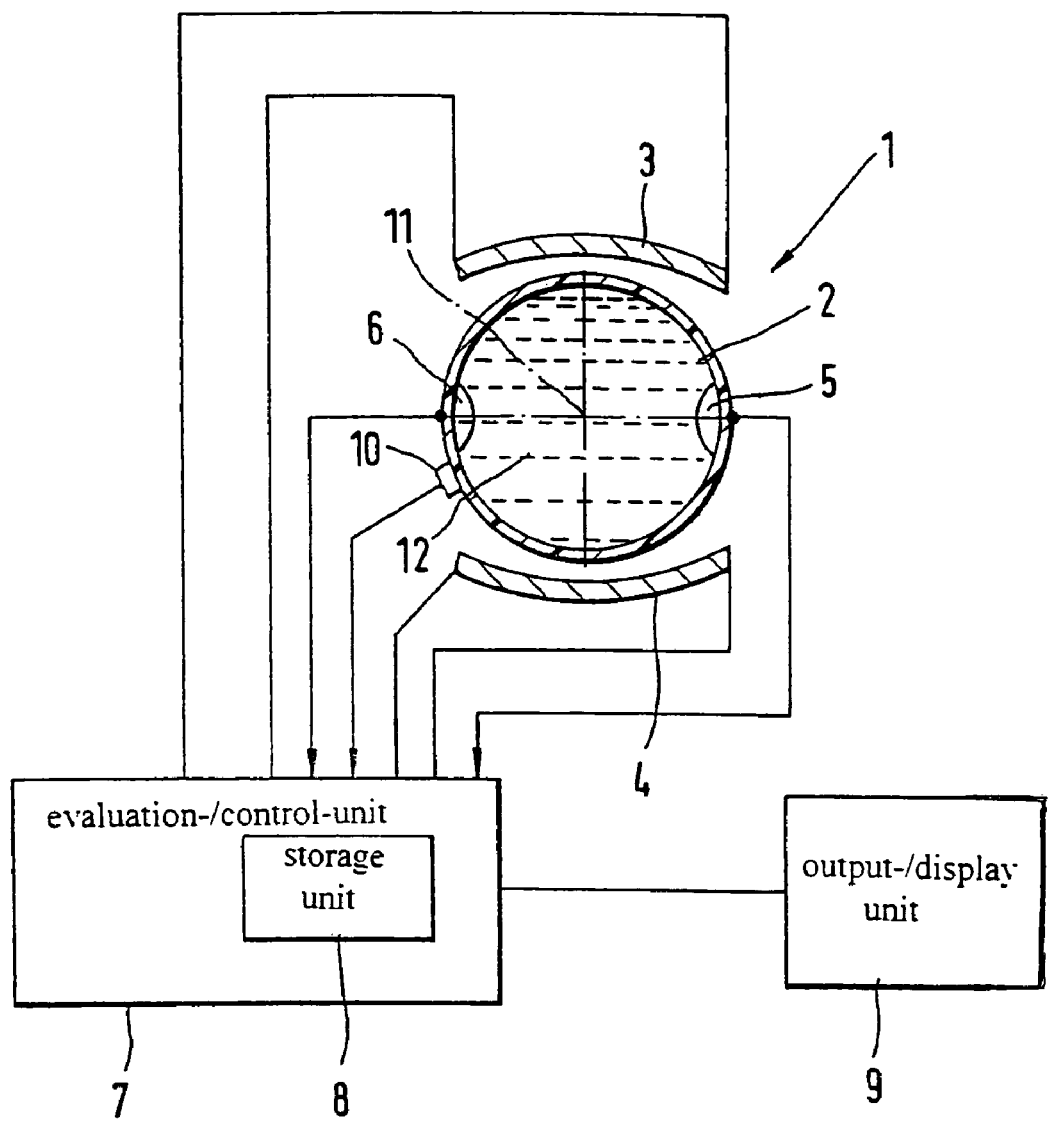
FIG. 1: a schematic representation of a preferred embodiment of the device of the invention

FIG. 1 shows a schematic representation an embodiment of the device of the invention. The embodiment is with reference to a magnetic-inductive measurement apparatus 1. Medium 12 flows through the measurement tube 2 of the measurement apparatus 1 in the direction of the measurement tube axis 11. The medium is at least to a small extent electrically conductive. The measurement tube 2 itself is made from an electrically non-conductive material, or it is at least coated internally with a non-conductive material.

A magnetic field produced by two diametrically opposed electromagnets 3, 4 is directed perpendicularly to the flow direction of the medium 12. Under the influence of the magnetic field, charge carriers present in the medium 12 migrate to the measurement electrodes 5, 6 of opposite polarity. The voltage arising between the two measurement electrodes 5, 6 is proportional to the flow velocity of the medium 12 averaged over the cross section of the measurement tube 2, i.e. this voltage is a measure of the volume flow of the medium 12 in the measurement tube 2. The measurement tube 2 is, moreover, connected by way of connecting elements, which are not separately shown in the drawing, with a pipe system, through which the medium is flowing.

In the illustrated case, the two measurement electrodes 5, 6 are in direct contact with medium 12; however, the coupling can also occur capacitively. The measurement electrodes 5, 6, like the electromagnets 3, 4, are connected by way of connecting lines with the evaluation-/control-unit 7. Although in what follows the measurements are always performed on one of the electromagnets 3; 4, it is, of course, also possible to perform the measurements on both electromagnets 3, 4 at the same time or alternately.

According to a preferred embodiment of the device of the invention, the evaluation-/control-unit 7 ascertains the voltage U on the electromagnet 3; 4 and at the same time the instantaneous current I flowing through the electromagnet 3; 4. Using the formula $R=U/I$, the evaluation-/control-unit 7 calculates the corresponding resistance R of the electromagnet 3; 4. Since the resistance R is temperature dependent, the temperature T of the electromagnet 3; 4 can be determined from the resistance values R. Preferably, measurements are performed over an extended period, with the measured resistance values R, or the temperature values T derived from the resistance values R, being indicators for the general thermal loading and, consequently, for the life span of the measurement apparatus 1.

Of course, it is also possible, alternatively to or combined with the directly or indirectly ascertained temperature values, to draw on the derivatives of the temperature values for the trend analysis. The derivatives of the temperature values provide worthwhile information concerning temperature spike loading of the measurement apparatus.

Beyond this—as likewise can be seen in FIG. 1—temperature can be determined using a separate temperature sensor 10. The temperature values established by the temperature sensor 10 are subsequently also used by the evaluation-/control-unit 7, for example, to provide trend statements concerning the life span of the measurement apparatus 1.

A storage unit 8 is provided in which the resistance values (R(T)) of the electromagnet (5,6) are stored as a function of temperature. Characteristic curves are filed in the storage unit 8, which relate the resistance (R(T)) of the electromagnet (5,6) or resistance changes $R((T)^n/t^m$ with $m,n>0$) of the at least one electromagnet (5,6) to the temperature (T) or, respectively, temperature changes ($T^n/t^m$ with $m,n>0$) of the measurement apparatus. The characteristic curves provide a relationship between the temperature (T) and the probable life span of the measurement apparatus.

Figure 2:
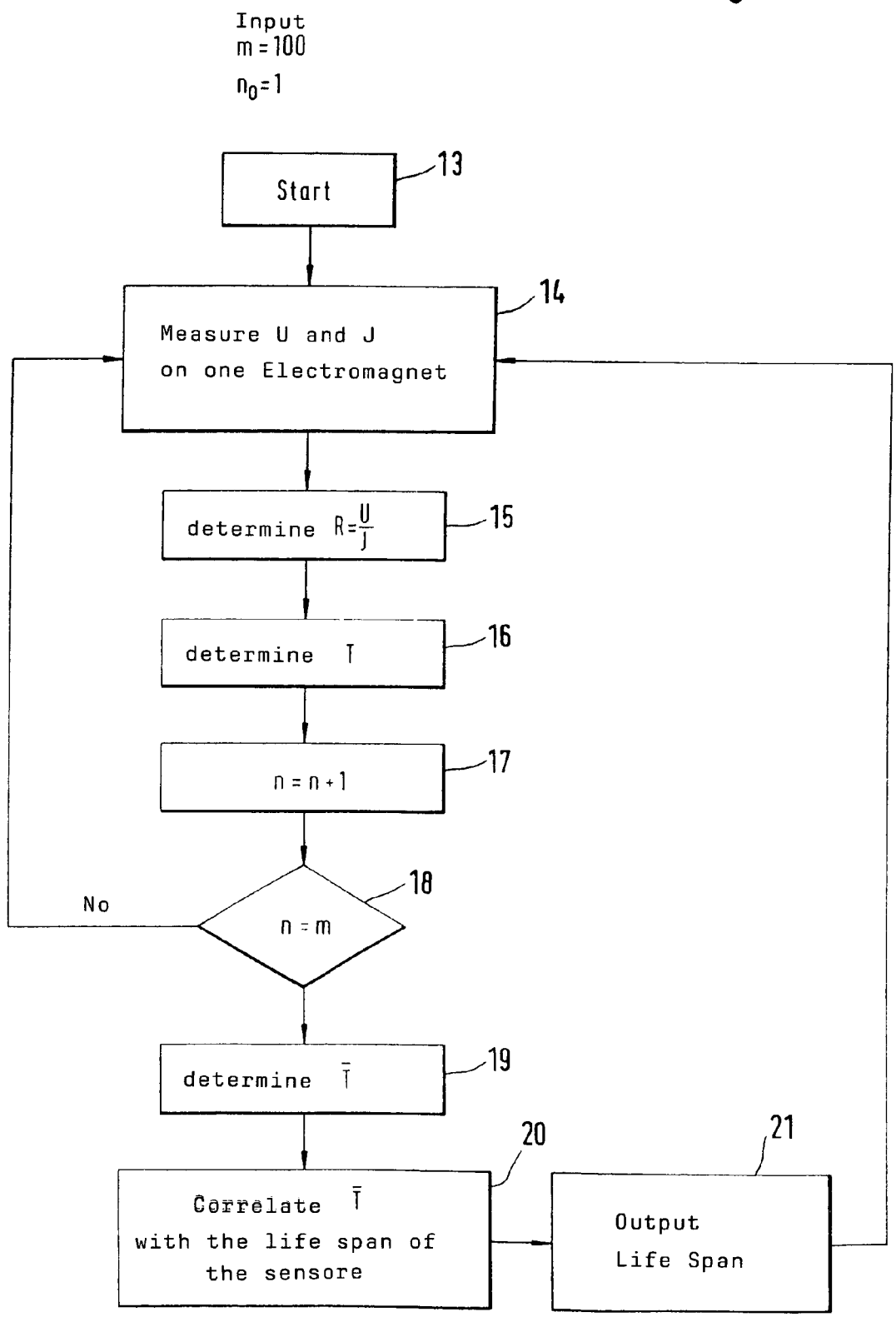
FIG. 2: a flowchart for operation of the evaluation-/control-unit.

FIG. 2 shows a flow diagram for operation of the evaluation-/control-unit 7. Preferably, the life span of the measurement apparatus 1 or of individual components of the measurement apparatus is established in a study lasting for an extended period of time. For this purpose, the start value $n_0$ and the end value m for the number of measurements to be carried out are input before the start of the program. At program point 14, the voltage U and the current I of the electromagnet 3; 4 is determined; the measured voltage U and current I are then used at point 15 to establish the resistance R of the electromagnet 3; 4. Subsequently at program point 16 the temperature T is made available on the basis of the resistance R. The program loop for establishing the temperature value T of the electromagnet 3; 4 runs until the number of pre-set measurements is reached. Using the measured and ascertained temperature values T, an average value is formed at program point 19. This average temperature is then related to the probable life span of the measurement apparatus 1 on the basis of a characteristic curve stored in storage unit 8. The established life span of the measurement apparatus 1 is then brought to the attention of operating personnel using an output-/display unit 9.

Since these are preferably measurements over an extended period of time, the time integral over the temperature values T is formed, more or less, wherein the measurement values, at least from the point of view of tendencies, give insight on the thermal loading of the measurement apparatus 1 over a correspondingly selected time period. Or, to express it differently: The measurement values are an indicator for the thermal loading and, thus, the expected life span of the measurement apparatus 1 or of individual components of the measurement apparatus 1. The measurement values are then used, for example, to establish the "Mean Time Before Failure." Use of the device of the invention means that it is no longer necessary to wait until the measurement apparatus completely fails. Also, it is no longer necessary that the measurement apparatus 1 be exchanged on a fixed schedule of preventative maintenance, without regard to how it is actually performing its function. Instead, the probable life expectancy of the measurement apparatus can be established in advance, on the basis of the now-possible trend analysis. An exchange of the measurement apparatus 1, or of individual components of the measurement apparatus 1, can then proceed exactly at that point in time when the functionality is no longer assured.

The invention claimed is:

1. In combination, a flow measurement apparatus and a thermal load monitoring device, the combination comprising:
    a measurement tube defining a longitudinal axis, a flowing medium flowing through said measurement tube in the direction of said longitudinal axis;
    a magnet component containing two electromagnets and at least one measurement electrode, wherein said electromagnets are arranged in relation to said measurement tube to produce a magnetic field passing through said measurement tube, said magnetic field oriented essentially crosswise to said longitudinal axis and wherein said at least one measurement electrode is arranged in a lateral region of said measurement tube and is galvanically or capacitively coupled with the flowing medium so that a measurement voltage is induced in said at least one measurement electrode in response to said flow of the flowing medium through the measurement tube
    a temperature sensor for sensing a temperature of said flowing medium and configured to provide a temperature value indicative of said temperature of said flowing medium;
    an evaluation/control unit;
        said evaluation/control unit configured to receive said induced measurement voltage from said at least one measurement electrode and to determine information about the flow of the flowing medium in said measurement tube from said induced measurement voltage and
        said evaluation/control unit configured to receive said temperature value from said temperature sensor and to perform a trend analysis of received temperature values to provide information about a thermal loading of said flow measurement apparatus based on said temperature values received over an extended time.

2. The combination as claimed in claim 1, wherein said temperature sensor is arranged such that it comes in contact with the flowing medium or said temperature sensor is arranged such that it is in immediate proximity to the flowing medium.

3. The combination as claimed in claim 1, wherein said evaluation/control unit uses said information about the thermal loading of said flow measurement apparatus for making a statement regarding the life span of said flow measurement apparatus or regarding the life span of individual components of said flow measurement apparatus.

4. The combination as claimed in claim 1, wherein said evaluation/control unit monitors the resistance of at least one electromagnet of said two electromagnets over an extended time, determines the temperature or the temperature change of said at least one electromagnet therefrom and uses the thus established temperature values of said at least one electromagnet for said trend analysis regarding the thermal loading of said flow measurement apparatus or regarding the thermal loading of individual components of said flow measurement apparatus.

5. The combination as claimed in claim 4, further comprising a storage unit, in which the resistance values of said at least one electromagnet of said two electromagnets are stored as a function of temperature.

6. The combination as claimed in claim 5, wherein characteristic curves are filed in said storage unit, which relate the resistance of said at least one electromagnet of said two electromagnets or resistance changes of said at least one electromagnet to the temperature or, respectively, temperature changes of said flow measurement apparatus.

7. The combination as claimed in claim 5, wherein characteristic curves are stored in said storage unit, which provide a relationship between the temperature of said at least one electromagnet of said two electromagnets or of said flow measurement apparatus and the probable life span of said flow measurement apparatus.

8. The combination as claimed in claim 7, wherein the characteristic curves are empirically established characteristic curves.

9. The combination as claimed in claim 7, further comprising an output/display unit, by way of which information on the probable life span of said flow measurement apparatus or of individual components of said flow measurement apparatus is made available to operating personnel.

* * * * *